(12) United States Patent
McAnulty

(10) Patent No.: US 7,775,488 B2
(45) Date of Patent: Aug. 17, 2010

(54) SUPPORT FOR A CAMERA

(75) Inventor: David McAnulty, Glasgow (GB)

(73) Assignee: Ronford-Baker Engineering Company Ltd., Waterford (GB)

( * ) Notice: Subject to any disclaimer, the term of this patent is extended or adjusted under 35 U.S.C. 154(b) by 0 days.

(21) Appl. No.: 12/098,998

(22) Filed: Apr. 7, 2008

(65) Prior Publication Data

US 2009/0114781 A1    May 7, 2009

Related U.S. Application Data

(63) Continuation of application No. 10/486,565, filed as application No. PCT/GB02/03825 on Aug. 19, 2002, now abandoned.

(30) Foreign Application Priority Data

Aug. 17, 2001    (GB)  ................................. 0120055.9

(51) Int. Cl.
*A47B 91/00*    (2006.01)
(52) U.S. Cl. ................. 248/188.7; 248/188.8
(58) Field of Classification Search ............. 248/188.7, 248/188.8, 188.9; 108/150, 153; 403/253, 403/381, 217–219, 170, 178
See application file for complete search history.

(56) References Cited

U.S. PATENT DOCUMENTS

| | | | |
|---|---|---|---|
| 1,717,142 A | 6/1929 | Bump | |
| 3,151,830 A | 10/1964 | Giacomini | |
| 3,188,033 A | 6/1965 | Groves | |
| 3,877,669 A | 4/1975 | Ambasz | |
| 4,081,806 A * | 3/1978 | Seckendorf | ................. 396/336 |
| 4,344,645 A | 8/1982 | Kirk | |
| 4,634,090 A | 1/1987 | Currie et al. | |
| 5,172,883 A | 12/1992 | Amirian | |
| 5,265,071 A * | 11/1993 | Thorgersen et al. | ........... 368/67 |
| 5,826,121 A | 10/1998 | Cardellini | |
| 6,079,196 A * | 6/2000 | Linder et al. | ................... 59/80 |
| 6,086,488 A | 7/2000 | Sanders | |
| 6,101,842 A * | 8/2000 | Delacretaz | ....................... 63/4 |
| 6,305,653 B1 | 10/2001 | Oldham et al. | |
| 6,579,016 B2 | 6/2003 | Chapman | |
| 6,626,410 B2 | 9/2003 | Marcotte et al. | |
| 6,711,272 B2 | 3/2004 | Rodgers | |
| 7,028,968 B2 * | 4/2006 | Washick | ..................... 248/521 |

FOREIGN PATENT DOCUMENTS

FR    2638622    5/1990

OTHER PUBLICATIONS

International Search Report for corresponding International Application No. PCT/GB02/03825, dated Nov. 6, 2002, total 3 pages.

* cited by examiner

*Primary Examiner*—Korie Chan
(74) *Attorney, Agent, or Firm*—Connolly Bove Lodge & Hutz LLP

(57) ABSTRACT

A support for a camera comprises a central hub (45) adapted to releasably connect with a plurality of radially displaced interchangeable arm or foot sections (A, B), wherein the arm section is adapted to interconnect if desired with an additional arm section and/or foot section to form a radially extending leg of a desired length. The hub may have a Mitchell type plate and is provided with one or more access windows to allow access to a central cavity.

15 Claims, 8 Drawing Sheets

SUPPORT FOR A CAMERA

CROSS-REFERENCE TO RELATED APPLICATIONS

This patent application is a continuation and claims priority pursuant to 35 U.S.C. §120 to U.S. patent application Ser. No. 10/486,565, filed Feb. 9, 2004, now abandoned, which is a 371 of International Application PCT/GB02/03825 filed Aug. 19, 2002, which are both specifically incorporated herein in their entirety, by reference.

BACKGROUND OF THE INVENTION

This invention relates to a support. In particular, but not exclusively, it relates to a support for a camera or other suitable equipment such as lighting or sound apparatus. In a preferred embodiment it relates to a type of support for use with camera riser sections which is generally known in the art as a 'bazooka base'.

A camera 'bazooka' 10 consists of one or more riser tubes 11, 12 connected to a camera leveler 13. Elements of the bazooka are interconnected via sleeve clamps 14 as shown in FIG. 1.

In situations where the bazooka base is intended for use with a 35 mm camera, the leveler 13 will include a Mitchell plate 15. The Mitchell plate is an industry standard camera fitting that is adapted to connect with a camera, and will be well known to a skilled reader.

A problem that arises with a conventional bazooka base 20 is that the leg sections 25 are rigid and afford little adjustment other than for minor vertical adjustments via the feet 26, and they are permanently attached to the central hub 27 of the base 20. Therefore, a user has little or no scope for adjustment of the base during use.

In some conventional bazooka bases one leg of the tripod arrangement can be removed and replaced with a leg of differing length. These are known as 'drop leg' devices. A situation where a user might desire to replace one of the standard legs would be when it was necessary to position a camera close into a corner location. Other bazooka bases have legs that are removable for compact transportation between locations.

FIG. 2 shows a plan view of the conventional bazooka base 20 depicted in FIG. 1. The base comprises a central hub 27 from which radiate three fixed legs 25. At the end of each leg distal from the central hub 27 is an adjustable foot 26 that allows the base to be leveled. Protruding from the centre of the hub is male lug 28 known in the art as a 'European boss' or 'Euro boss' (see also FIG. 3). The Euro boss is a standard fitting that enables riser tubes 11, 12, specifically 'Euro risers', to be securely connected to the base as shown in FIG. 1. A riser tube 11, 12 is locked to the Euro boss 28 by means of a lockable sleeve clamp 14. Sleeve clamps are also used to interconnect individual riser tubes to achieve a bazooka of a desired height. FIG. 3 is an elevation view of the conventional bazooka base of FIG. 2, and clearly shows the disposition of the Euro boss (the adjustable feet are not shown for simplicity).

A further problem with a conventional bazooka base will now be described with reference to FIG. 1. As can be see from this figure, the radial extent of the Mitchell plate 15 that sits atop the bazooka is greater by a significant amount than that of the sleeve clamp/Euro boss arrangement at the base of the bazooka. Given the considerable weight of the camera that would normally be mounted on the Mitchell plate, it is evident that when in use, a user will need to have regard to stability considerations when deciding upon camera positioning. Stability considerations have resulted in the choice of leg arrangement currently in use with bazooka bases; the bazooka bases must necessarily have a wide stance. In general, the legs are either integral with the base hub, and hence not removable, or removable to facilitate easier transportation but requiring a relatively complicated assembly/removal mechanism. Furthermore, the currently available bazooka bases do not provide a user with a range of leg arrangements to accommodate the wide variety of camera positions demanded in modern filming techniques.

The present invention arose in an attempt to overcome some or all of the above problems, and to further provide a flexible and versatile support for a camera.

According to an aspect of the present invention there is provided a support for a camera comprising a central hub adapted to releasably connect with a plurality of radially displaced interchangeable arm or foot sections, wherein the arm section is adapted to interconnect with an additional arm section and/or foot section to form a radially extending leg of a desired length.

Preferably, the hub, foot and arm sections interconnect via a dovetail mortice and tenon joint.

Preferably, the dovetail mortice and tenon joint is tapered.

According to another aspect of the present invention there is provided a support for a camera comprising a central hub adapted to releasably receive a plurality of radially extending limb elements, wherein the central hub includes a Mitchell-type camera plate.

Preferably, the central hub includes at least one, preferably a plurality of radially separated, circumferential access windows allowing access to an axial cavity. According to another aspect of the present invention there is provided a support for a camera comprising a plurality of radially extending arms/limbs releasably dovetailed thereto.

BRIEF DESCRIPTION OF THE DRAWINGS

An embodiment of the present invention will now be described, by way of example only, with reference to the accompanying schematic drawings, in which.

DETAILED DESCRIPTION

Figure 1:
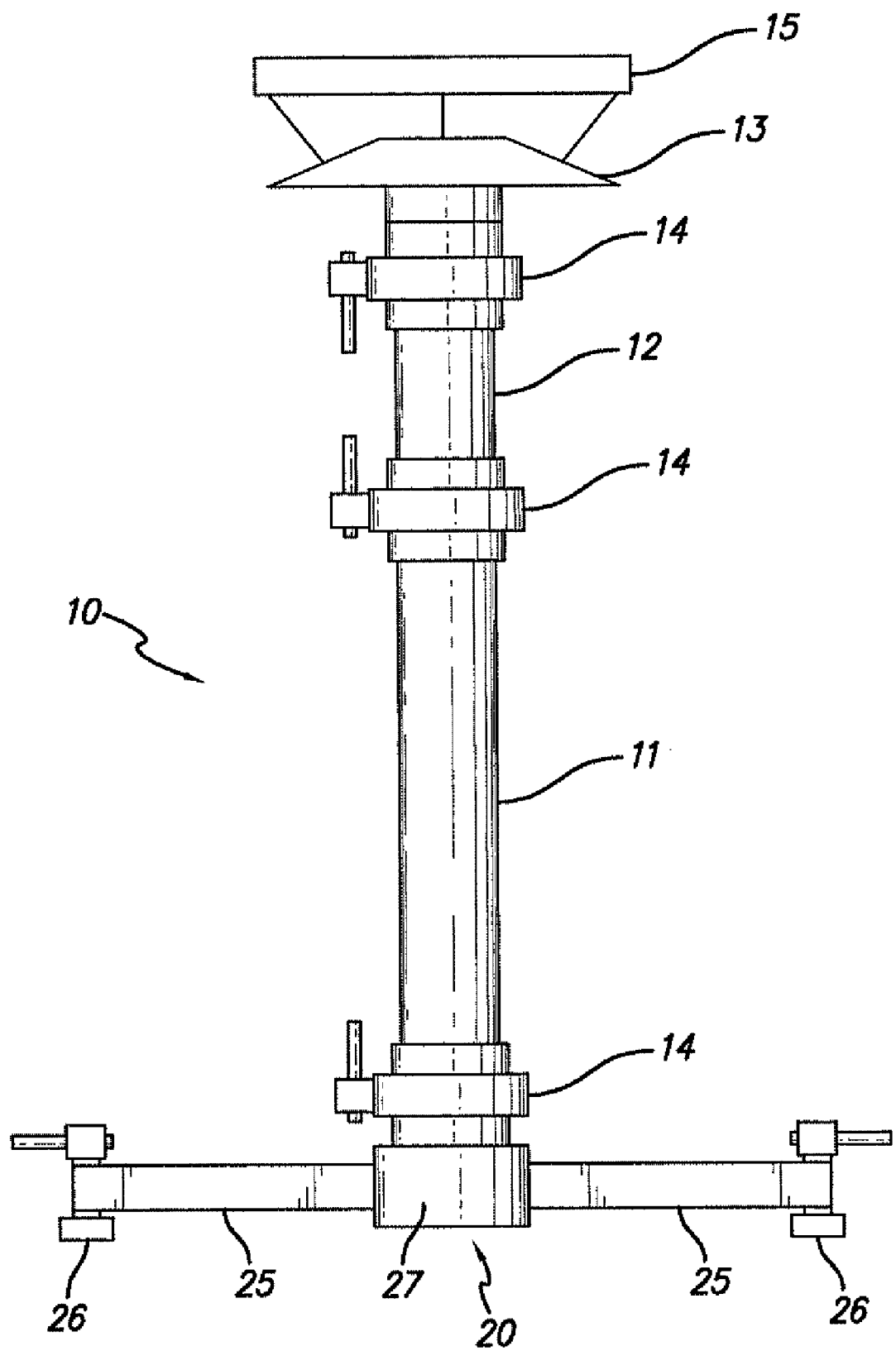
FIG. 1 shows a conventional camera bazooka and bazooka base arrangement.
Figure 2:
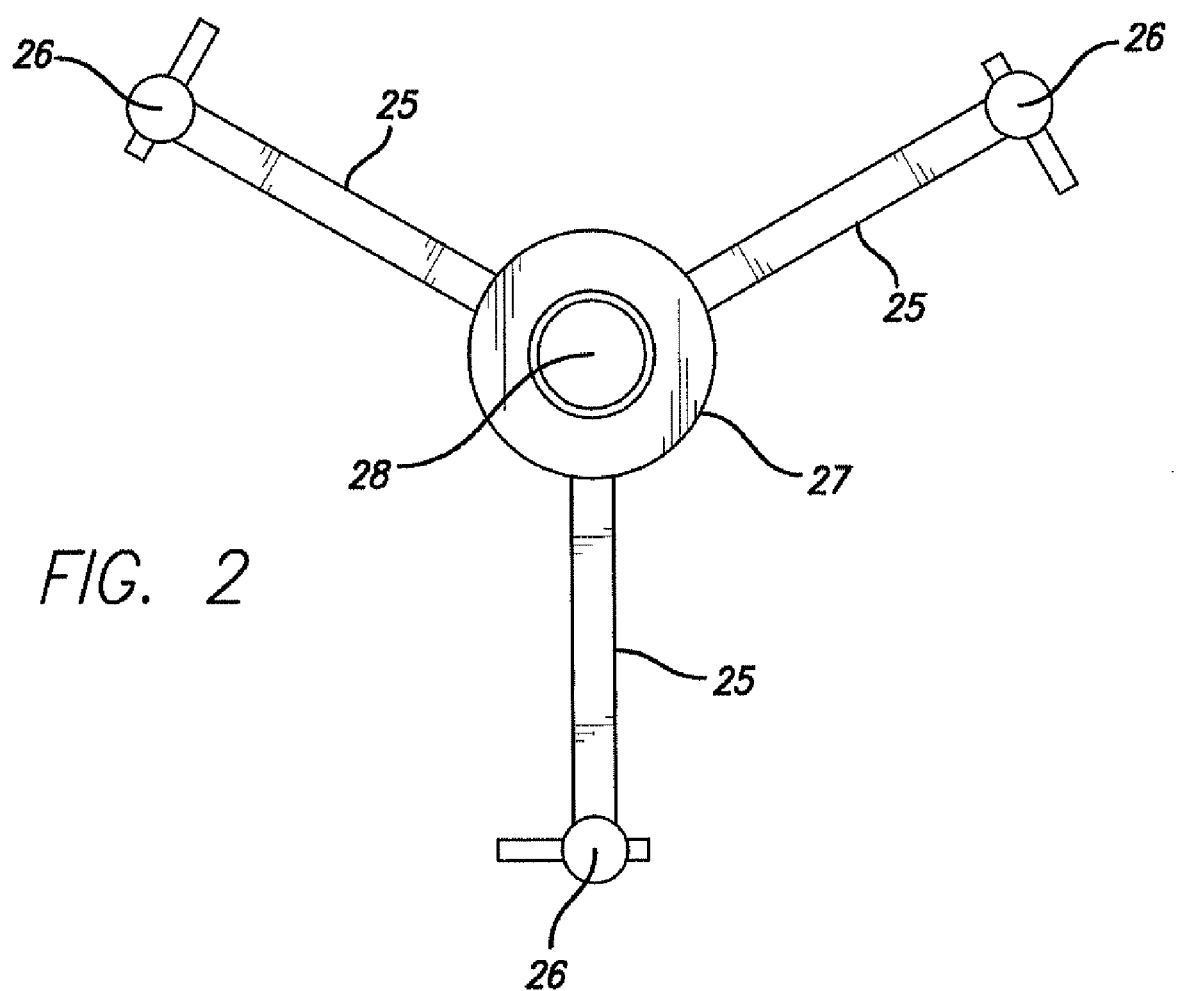
FIG. 2 shows a plan view of the conventional bazooka base of FIG. 1.
Figure 3:
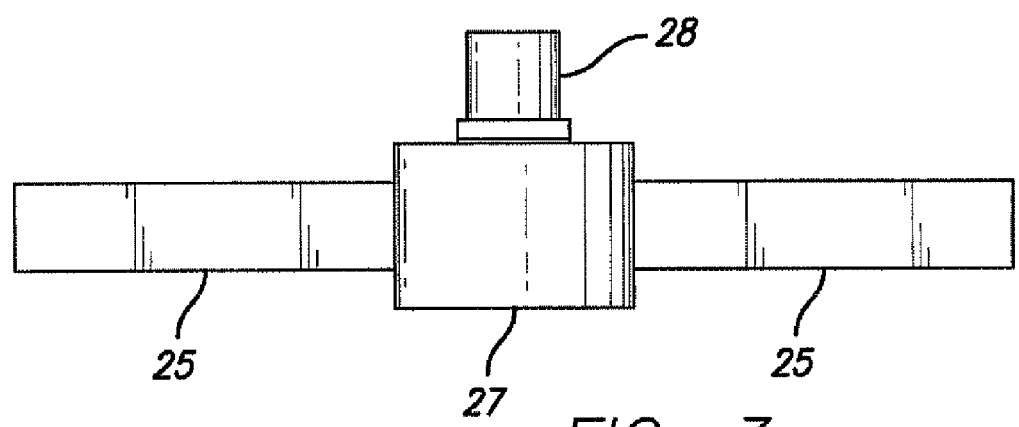
FIG. 3 shows a detail of a side elevation view of the conventional bazooka base of FIG. 2.
Figure 4:
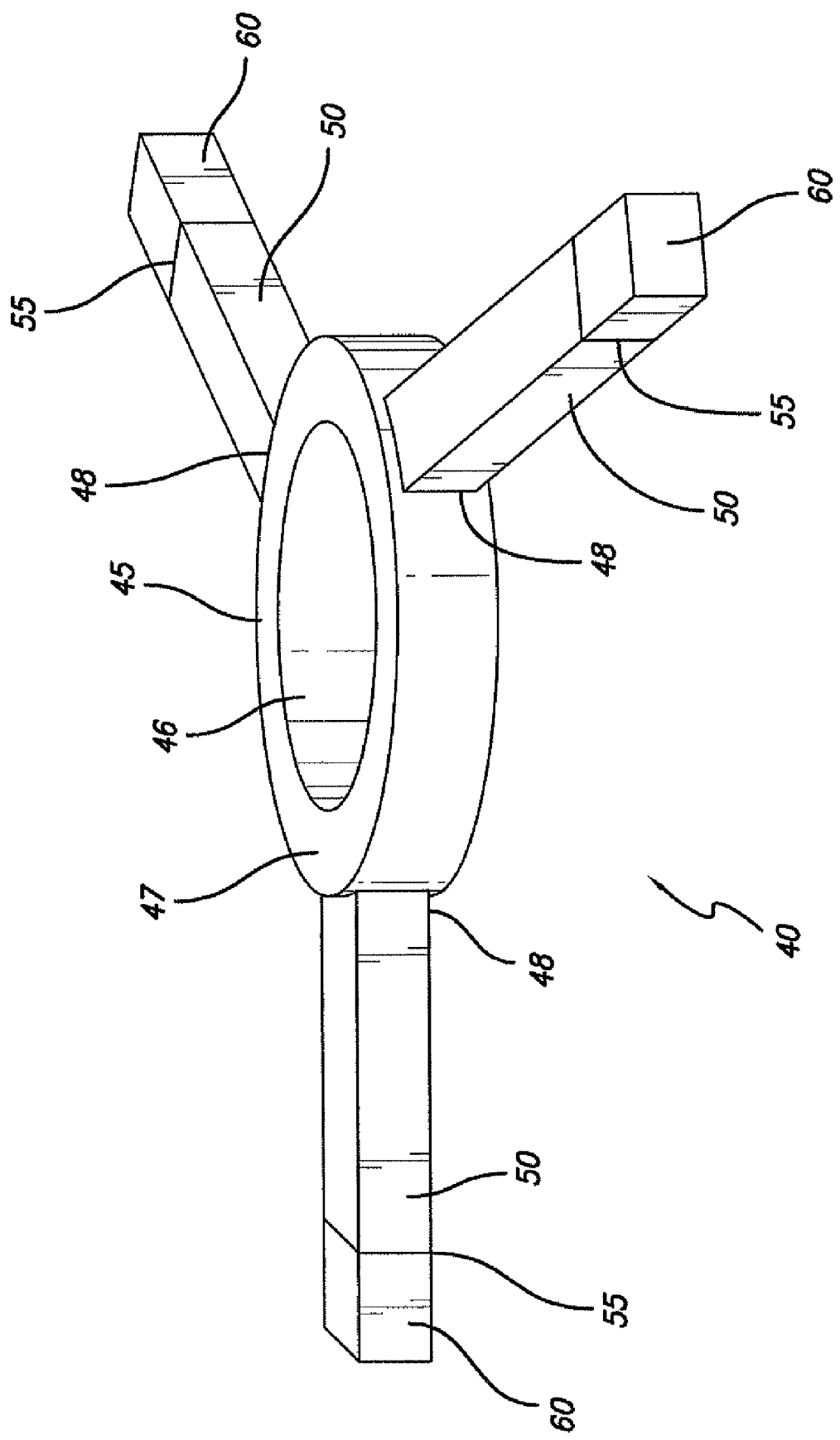
FIG. 4 shows a schematic block diagram of a support for a camera.

FIG. 4 shows a schematic embodiment of a bazooka base of the present invention in perspective view. The bazooka base 40 comprises a central hub 45 to which are connected three arm members 50. To each arm member 50 is connected a foot member 60. For clarity, the foot members are depicted slightly removed from the arm members; in use, foot members will be tightly secured to either a leg member or may be connected directly to the central hub, without an intervening leg member, depending upon the given situation. Any combination of leg/feet members may be mounted to the hub, as required by a particular situation.

A foot member 60 is connected to an arm member 50 at point 55 via a dovetail joint (not shown). Likewise, an arm member 50 is connected to the central hub 45 at point 48 via a dovetail joint (not shown). The dovetail joints used in the bazooka base will be discussed below with reference to FIGS. 9 and 10.

In a preferred embodiment, the central hub, foot and arm members are constructed from aluminum with its advantage of being both light and strong relative to other materials such as steel for example. Alternatively, the components could be fabricated from other strong yet light materials such as various alloys, carbon fibre or a carbon fibre composite material. In order that the weight to strength ratio is optimized, the arm members are preferably constructed from I-section aluminum units. Also to maximize the strength/weight ratio, the central hub 45 is preferably milled from a solid aluminum billet. This allows for the introduction of access windows (not shown—see below) on the circumference of the central hub in positions between points 48 without compromising the strength and integrity of the central hub as a whole. These access windows afford access into the central axial cavity 46 of the central hub 45.

In a preferred embodiment, the central hub 45 includes a Mitchell plate (not shown—see below) on the topmost surface 47 of the hub. This allows for the direct attachment of either a camera or a Mitchell-type riser tube without the need for a Euro-Mitchell adapter device. Secure attachment to the Mitchell plate of either a riser tube or a camera is facilitated by the inclusion of the access windows mentioned above and discussed below. These windows allow a user to tighten the securing nuts positioned below a Mitchell plate without the need to up-end the bazooka base.

Figure 5:
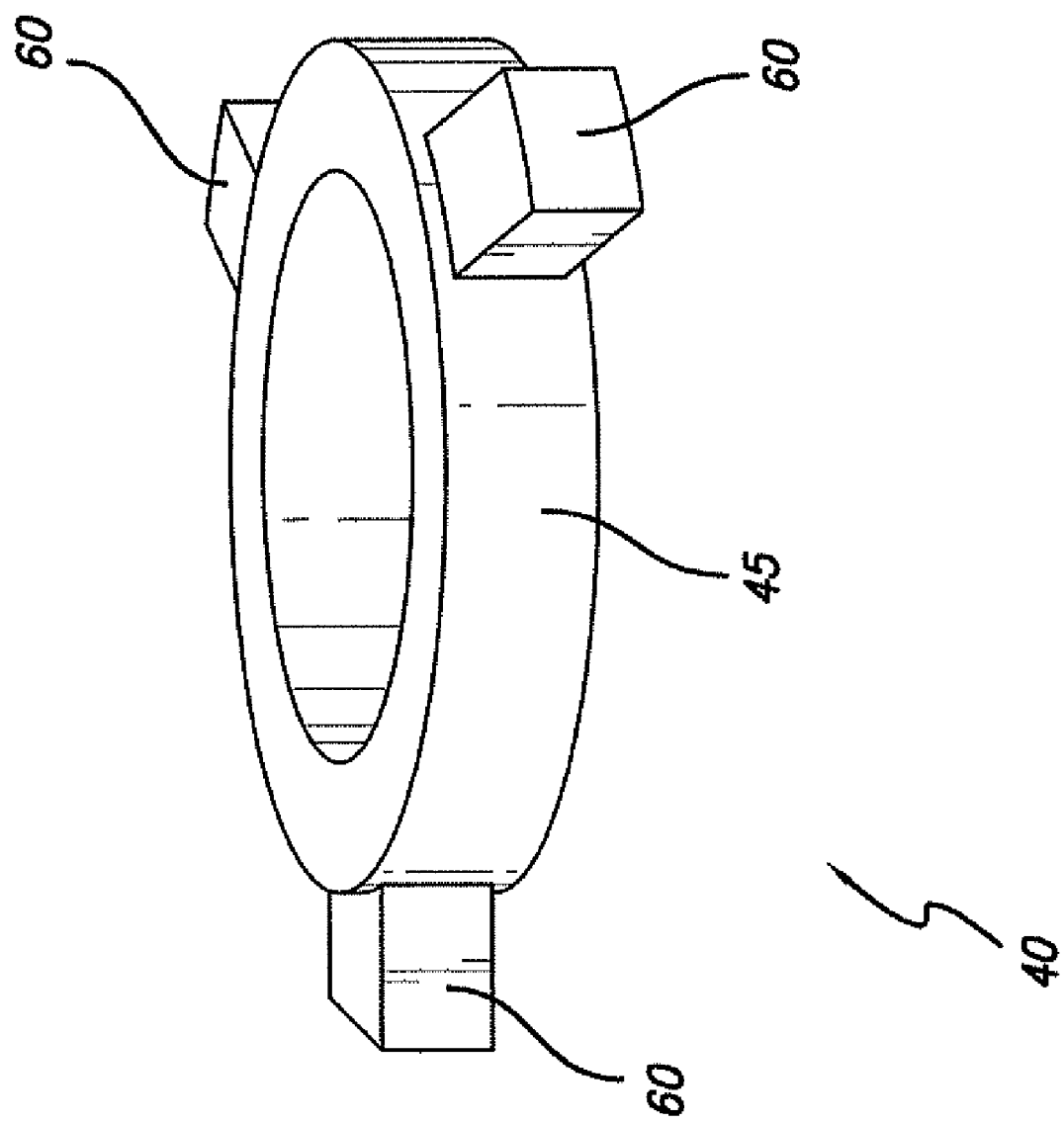
FIG. 5 shows a schematic block diagram of a support for a camera in a possible arrangement.

FIG. 5 shows the bazooka base 40 in a 'hi-hat' configuration. Here, a narrow stance bazooka base footprint is achieved by attaching three foot members 60 directly to the central hub 45 without incorporating any arm members. This is possible due to the universal dovetail joint that is used on all elements of the bazooka base 40 that allows for interchangeability between the various members.

Figure 6:
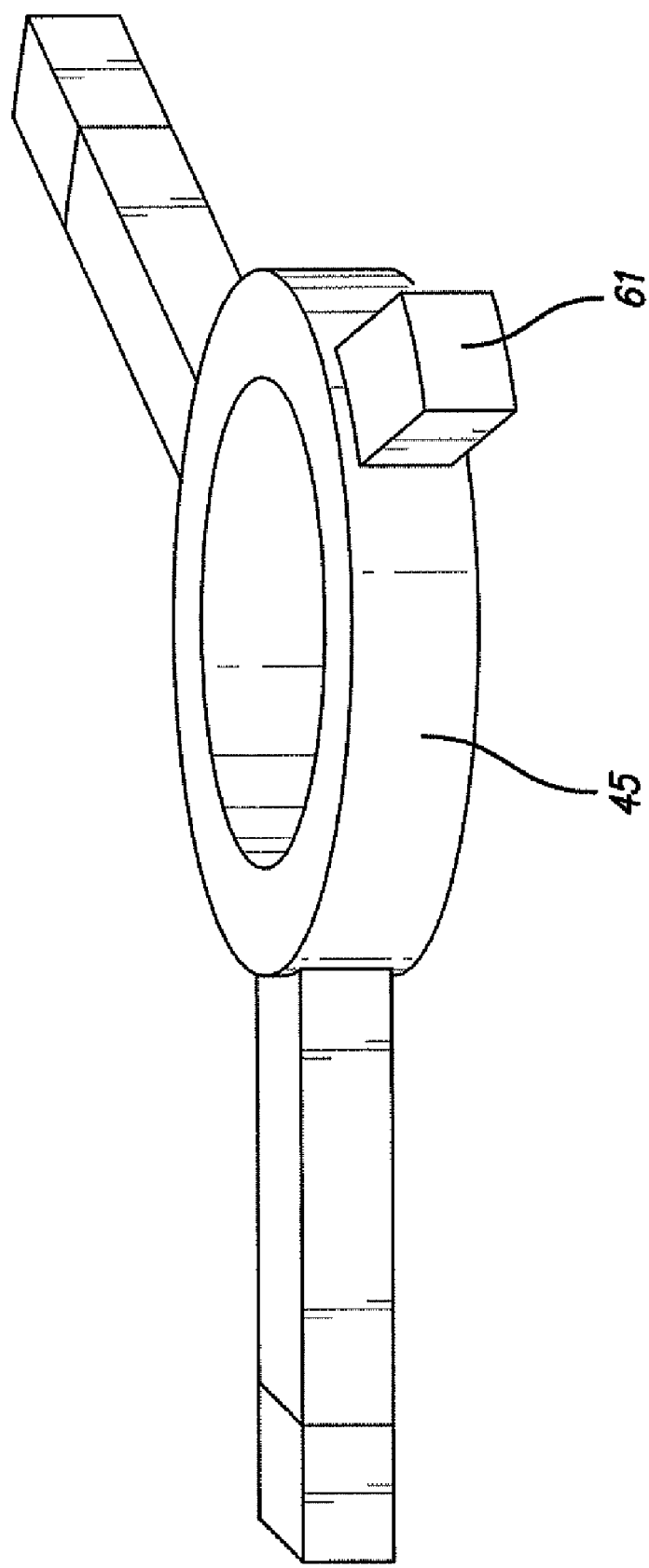
FIG. 6 shows a schematic block diagram of a support for a camera in another possible arrangement.

In FIG. 6 the bazooka base of FIG. 4 is shown with one arm member removed and with a foot member 61 connected directly to the central hub 40. This configuration might arise when the camera needs to be positioned tight into a corner of a location set.

Figure 7:
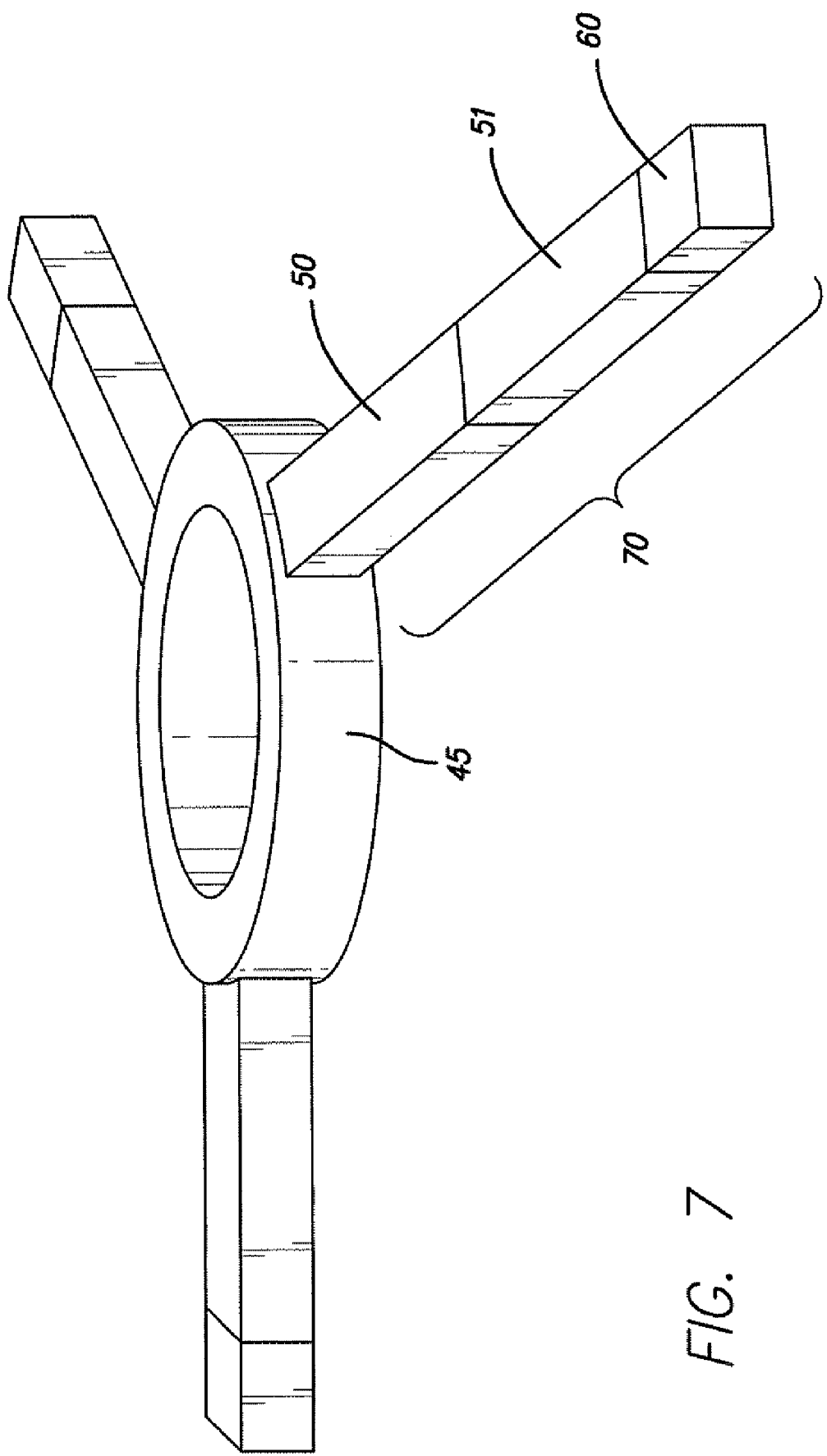
FIG. 7 shows a schematic block diagram of a support for a camera in yet another possible arrangement.

FIG. 7 shows another alternative configuration. Here, one limb 70 (a 'limb' or 'leg' is defined as either a single foot member or a foot member plus at least one arm member) is extended by the introduction of a second arm member 51 between a first arm member 50 a foot member 60. The reader will be aware that the above arm/foot permutations of the bazooka base are but a few examples of the many possible variations.

The bazooka base will now be discussed with reference to FIG. 8. Here, the bazooka base 40 is shown in elevation view with a third limb obscured.

The central hub 45 is shown with an access window 49 disposed between limb A and limb B. The reader should be aware that there is a corresponding window between limb A and the limb obscured from view, and also between limb B and the hidden limb. Thus a user is able to gain access to the central axial cavity 46 from three separate directions.

Limb A comprises a foot member 60 interconnected with an arm member 50, likewise, limb B comprises a foot member interconnected with an arm member. Each foot member includes a stanchion member 80 that is releasably held within the body of the foot member. Various clamping means to perform such a releasable holding function are well known in the art, for example, fixing grub screws or the like might be included.

Each stanchion member 80 includes a footpad 81, a lock nut 82 and an adjustment knob 83. Leveling of the bazooka base is achieved by adjustments to the three individual footpads by rotation of the respective adjustment knobs 83. Once a desired level is attained, the bazooka base can be secured at this position by application of the individual locking nuts 82. In a preferred embodiment of the bazooka base, each footpad is afforded a certain degree of axial swivel to allow for local anomalies in the surface on which the bazooka base is to be placed. Also, since in some embodiments the external diameter of the stanchion members 80 is equal to that of a standard gauge scaffolding tube, the stanchion members can be advantageously replaced by scaffolding tubes of any desired length to accommodate the requirements of any given situation.

The central hub 45 includes an integral coaxial Mitchell plate 90 that allows for direct connection of a camera, a Mitchell-type camera riser section or any other suitable piece of camera equipment adapted to interlock with the standard Mitchell plate 90.

Figure 8:
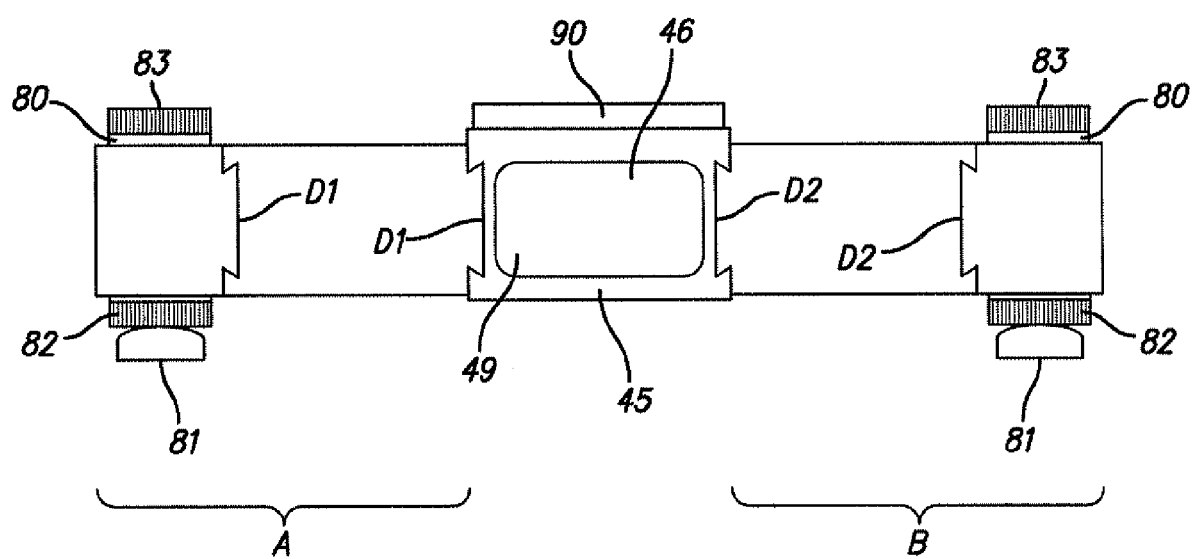
FIG. 8 shows a side elevation view of a support for a camera.
Figure 9:
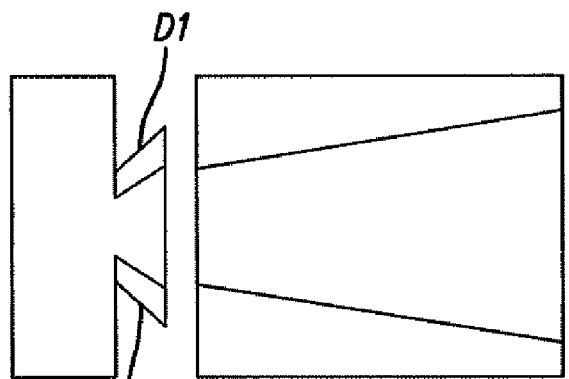
FIG. 9 shows a side elevation view and a plan view of a dovetail tenon joint.
Figure 10:
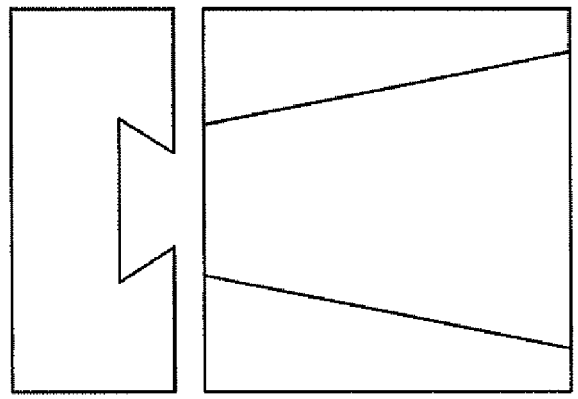
FIG. 10 shows a side elevation view and a plan view of a dovetail mortice joint.

As shown in FIG. 8, all elements of the bazooka base (feet, arms and hub) are interconnected via a universal dovetailed mortice and tenon joint. Elevation views of the dovetail tenon and dovetail mortice are shown in FIGS. 9 and 10 respectively. In a preferred embodiment of the bazooka base the dovetail joint is tapered as shown, thus allowing a releasable force fit to be obtained between interconnecting elements. However, the reader will appreciate that there are other suitable joint means that could be employed, for example a plane mortice and tenon joint or a dowel pin and hole arrangement etc. To aid strength and stability a form of locking or clamping means [not shown] may be employed at each joint that coerces the dovetail towards the thin end of the socket taper. In this way a rigid join may be secured.

FIG. 8 shows the dovetails with the taper running in clockwise direction [when viewed from above], thick end to thin end. Therefore dovetails D1 of limb A and dovetails D2 of limb B correspond to the respective end of the dovetail as indicated with the same reference numeral in FIG. 9.

FIG. 9 shows elevation views of the 'dovetail' or dovetailed tenon, and FIG. 10 shows elevation views of the 'socket' or dovetailed tenon. [The reader should note that these views are not to scale].

The advantage of the support for a camera as described above is that it is modular and compact with interchangeable foot and arm members that can be concatenated to form a limb of a desired length. Thus, a limb may have a plurality of leg members, terminating in a foot member for example. Each radial position may have a different configuration of leg/foot members, allowing maximum flexibility in positioning and accommodating a bazooka type support.

Furthermore, the preferred use of a bazooka base advantageously includes an integral Mitchell plate and access windows for releasably securing camera equipment directly to the base. The use of a Mitchell base has not been considered before. One of the reasons for this is that the additional inventive step of providing one or more access windows has not been realized. Mitchell bases require access from below to secure apparatus any apparatus to them. Heretofore, the use of a Mitchell base has not been proposed partly because of this perceived problem. The use of access windows enables apparatus, including riser tubes, to be connected to the Mitchell plate, without requiring access from below. Clearly, access from below is undesirable as it necessitates up-ending a cumbersome and heavy piece of equipment.

What is claimed is:

1. A camera support device comprising:
   a central hub having a surface feature adapted to releasably connect with a camera, the central hub comprising at least three attachment points positioned radially around an exterior surface of the hub; and
   at least three limb sections releasably attached to the central hub, wherein each limb section is attached directly to a respective attachment point, wherein each limb section is formed from elements selected form the group consisting of one or more arm sections, a foot section, and combinations thereof, wherein the limb sections include one end attached to the central hub and an opposite end extending radially away from the hub that contacts a supporting surface;
   wherein the central hub includes at least one circumferential access window positioned separately from the attachment points that permits access from outside of the hub into a hub internal axial cavity, and wherein a camera is releasably connected with the central hub.

2. The camera support device as recited in claim 1 wherein the camera is connected to a top surface of the central hub.

3. The camera support device as recited in claim 1 comprising a camera attachment means that is disposed within the hub axial cavity and that is accessible through the access window.

4. The camera support device as recited in claim 2 further comprising a camera plate that is interposed between the camera and the central hub.

5. A camera support device comprising:
   a central hub having a surface feature adapted to releasably connect with a camera, the central hub comprising at least three attachment points positioned radially around an exterior surface of the hub; and
   a number of limb sections releasably attached to the central hub at respective attachment points, wherein each limb section is formed from elements selected form the group consisting of one or more arm sections, a foot section, and combinations thereof, wherein the limb sections include one end attached to the central hub and an opposite end extending radially away from the hub that contacts a supporting surface;
   wherein the central hub includes at least one circumferential access window positioned separately from the attachment points that permits access from outside of the hub into a hub internal axial cavity;
   wherein the central hub attachment points are positioned approximately 120 degrees from one another; and
   wherein at least two of the limb sections have a different length.

6. The camera support device as recited in claim 1 wherein two or more of the limb sections are constructed having the same length.

7. The camera support device as recited in claim 1 wherein all three of the limb sections are constructed having the same length.

8. The camera support device as recited in claim 1 wherein the central hub attachment points are positioned 120 degree apart from one another.

9. The camera support device as recited in claim 1 wherein at least two of the limbs are constructed having a different length.

10. A camera equipment support device comprising:
    a central hub that is releasably connected with a piece of camera equipment, the central hub including an internal axial cavity that accommodates connection with the camera equipment, the central hub comprising three or more attachment points positioned radially around an exterior surface of the hub; and
    at least three limb sections releasably attached to the central hub, wherein each limb section is directly attached to the central hub at respective attachment points, wherein each limb section is formed from elements selected form the group consisting of one or more arm sections, a foot section, and combinations thereof, wherein the limb sections include one end attached to the central hub and an opposite end extending radially away from the hub that contacts a supporting surface;
    wherein the central hub includes at least one circumferential access window positioned separately from the attachment points to provide access to a means used for attaching the camera equipment to the central hub; and
    wherein at least two of the limb sections have a different length.

11. The support device as recited in claim 10 further comprising a plate that is interposed between a top surface of the central hub and the piece of camera equipment.

12. The support device as recited in claim 10 wherein one or more of the limb sections includes two or more leg sections, and one or more of the limb sections includes a foot section.

13. The support device as recited in claim 10 wherein one or more of the limb sections comprises a foot section.

14. The support device as recited in claim 13 wherein one or more of the limb section comprises a foot section that is connected directly to the central hub.

15. The support device as recited in claim 10 wherein the central hub comprises two or more circumferential access windows.

* * * * *